United States Patent [19]
Tomoyuki

[11] Patent Number: 4,667,765
[45] Date of Patent: May 26, 1987

[54] FRAME FOR A FOUR-WHEEL VEHICLE

[75] Inventor: Tomoyuki Nagashima, Saitama, Japan

[73] Assignee: Honda Giken Kogyo Kabushiki Kaisha, Tokyo, Japan

[21] Appl. No.: 703,253

[22] Filed: Feb. 20, 1985

[30] Foreign Application Priority Data

Feb. 20, 1984 [JP] Japan .............................. 59-22674[U]

[51] Int. Cl.⁴ ........................ B62D 21/02; B62K 11/04
[52] U.S. Cl. .................................... 180/311; 280/269; 280/798
[58] Field of Search ............... 180/311, 210, 215, 219, 180/312; 280/279, 281 R, 282, 781, 798, 270, 267, 269

[56] References Cited

U.S. PATENT DOCUMENTS

D. 277,088  1/1985  Murakami ........................ D12/107
950,728  3/1910  Provot .............................. 180/311 X
4,070,032  1/1978  Cunningham .................... 280/279 X
4,165,094  8/1979  Onda .................................. 280/282 X
4,325,449  4/1982  D'Addio et al. ................ 180/215 X
4,535,869  8/1985  Tsutsumikoshi et al. ........... 180/311

FOREIGN PATENT DOCUMENTS 583472  10/1958  Italy ..................................... 280/781
59-122923  8/1984  Japan .

Primary Examiner—John J. Love
Assistant Examiner—Charles R. Watts
Attorney, Agent, or Firm—Lyon & Lyon

[57] ABSTRACT

A four-wheel vehicle having an upper frame, a lower frame and a pipe frame connecting the upper and lower frames at the forward end of the vehicle. A steering shaft extends from a steering handle through the pipe frame to steering linkages for controlling the front wheels.

3 Claims, 6 Drawing Figures

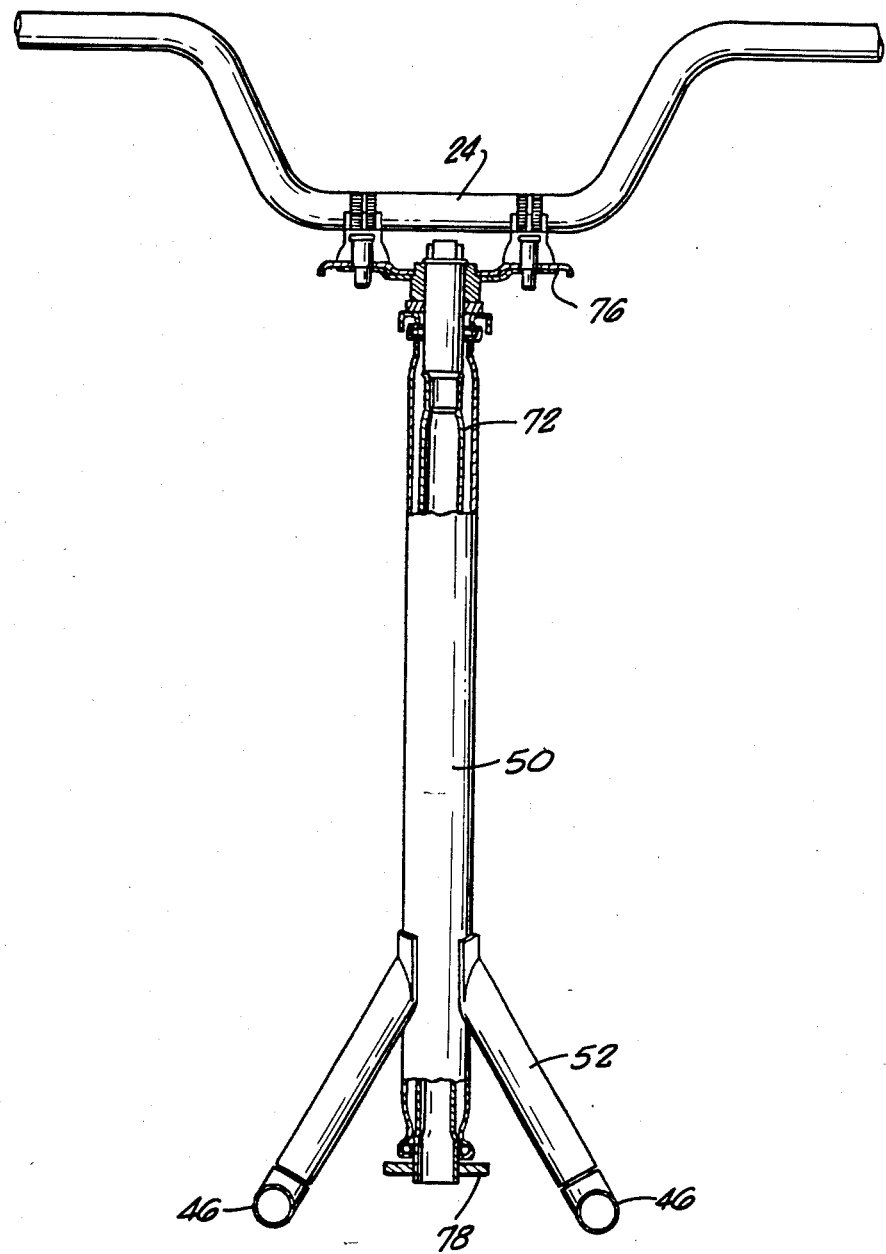

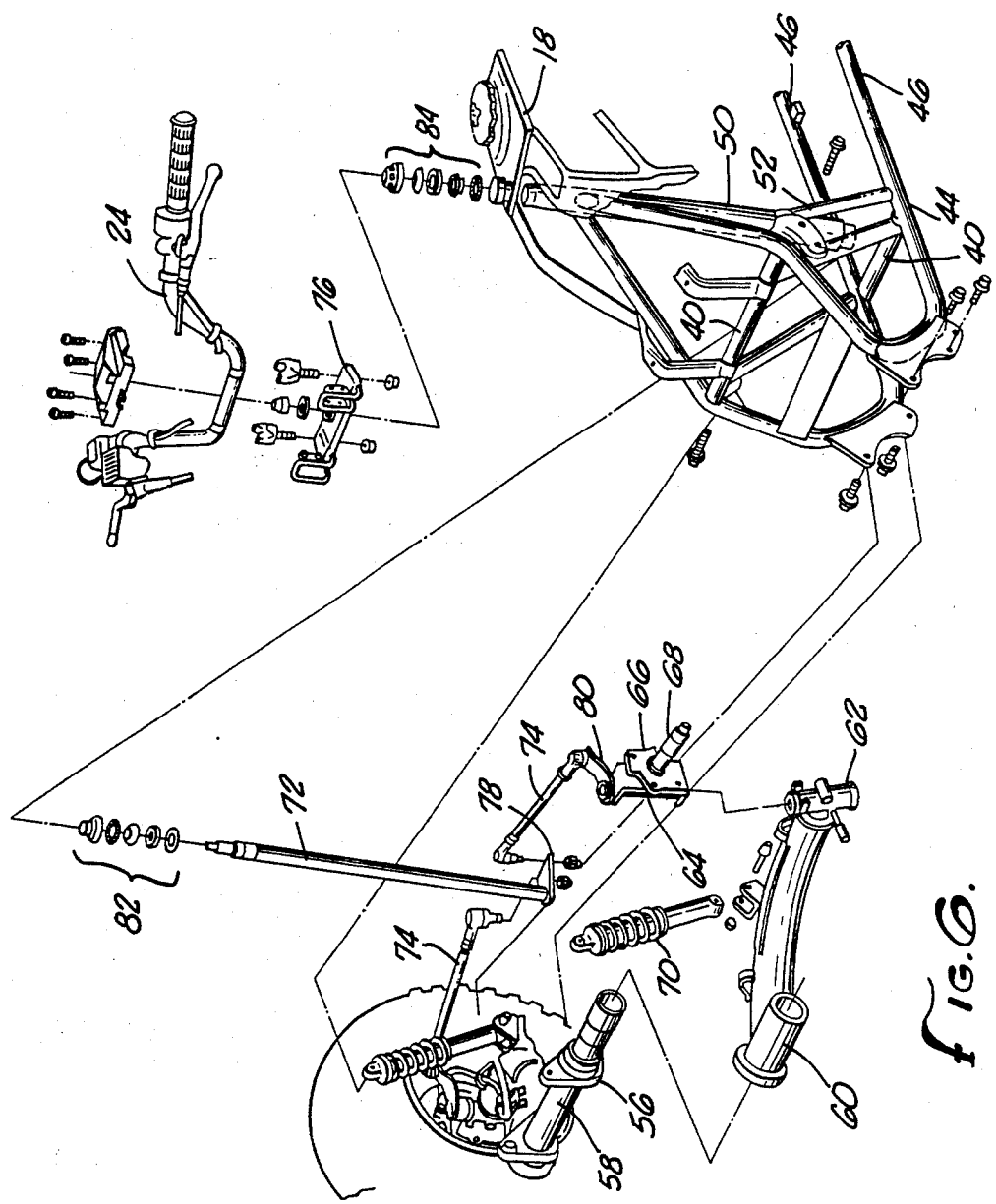

FRAME FOR A FOUR-WHEEL VEHICLE

BACKGROUND OF THE INVENTION

The field of the present invention is frame structures for vehicles.

Four-wheel, off-road type vehicles have typically employed a frame structure comprised of upper frame elements, lower frame elements and reinforcing members connecting these upper and lower elements. Such structural arrangements require excessive space, material and resulting weight. Such four-wheel vehicles which are generally of the small off-road type employing steering by a steering handle are preferably as light and compact as possible; excessive size and weight having a more significant effect on such vehicles than on larger four-wheel vehicles. Consequently, excessive frame structure, adding weight and bulk to such a vehicle, is particularly disadvantageous.

SUMMARY OF THE INVENTION

The present invention is directed to the structural arrangement of a frame for a four-wheel vehicle of the type employing a steering handle. The frame structure of the present invention includes an upper frame, a lower frame and a pipe frame extending between the upper and lower frames at the forward portion of the vehicle. The employment of such a pipe frame to associate the upper and lower frames together at the forward portion of the vehicle eliminates the conventional reinforcing members which normally would be displaced laterally from the centerline of the vehicle. Thus, additional weight and bulk is avoided. A steering shaft may extend through the pipe frame and be linked with steerable front wheels. At the upper end of the shaft, a steering handle may be employed for steering. Thus, the pipe frame serves the function of a bearing case for the steering shaft as well as of a structural member. As a result, additional weight and bulk is avoided.

Accordingly, it is an object of the present invention to provide an improved frame structure for a four-wheel vehicle of the type employing a steering handle. Other and further objects and advantages will appear hereinafter.

BRIEF DESCRIPTION OF THE DRAWINGS

FIG. 5 is a side view of the pipe frame of the present invention in association with a steering assembly.

FIG. 6 is an exploded perspective view of the front assembly of the frame structure and steering in accordance with the present invention.

DETAILED DESCRIPTION OF THE PREFERRED EMBODIMENT

Figure 1:
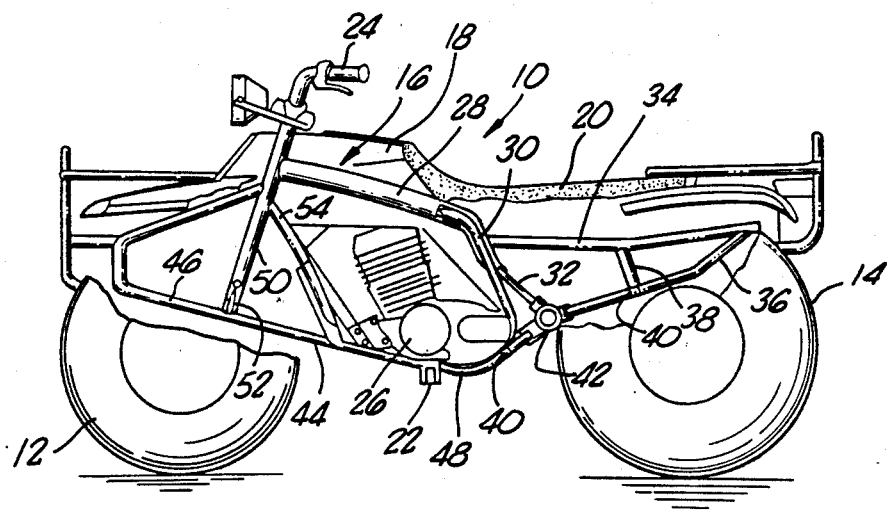
FIG. 1 is a side elevation of a frame of the present invention employed on a four-wheel vehicle.
Figure 2:
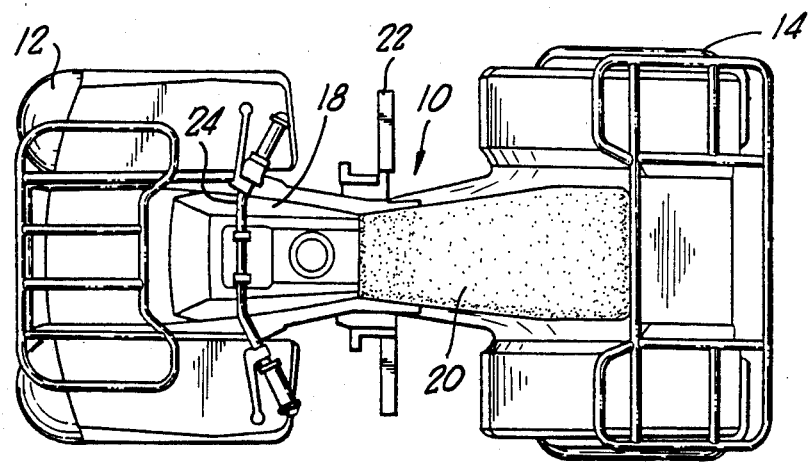
FIG. 2 is a plan view of the vehicle of FIG. 1.

Turning in detail to the drawings, FIG. 1 and FIG. 2 illustrate a four-wheel vehicle having a body, generally designated 10, two steerable front wheels 12 and two rear wheels 14. The body 10 includes a body frame, generally designated 16, and a body cover 18. The body cover 18 extends to over each of the wheels and provides for a seat 20. In this vehicle, the body 10 is straddled by a rider on the seat 20 to use foot pegs 22 located on each side of the vehicle. A steering handle 24 is employed with the steerable front wheels 12 to control the direction of the vehicle. An engine 26 is located within the frame 16.

Looking in greater detail to the body frame 16, an upper frame 28 extends fore and aft in the upper portion of the body 10. This upper frame is principally defined by an upper main pipe extending rearwardly with a slight downward incline on the vehicle. Behind the engine 26, the upper main pipe extends at a greater incline toward the area of the rear suspension pivot. Extending downwardly from the upper main pipe of the upper frame 28 to either side thereof are back inclined members 30. Also extending downwardly and rearwardly from the aft portion of the upper main pipe is a reinforcing member 32.

Extending aft from the upper frame 28 is a seat rail 34 supported by reinforcing members 36, struts 38 and spacer members 40. The reinforcing members 36 and 32 converge to a pivot structure 42.

Below the upper frame 28 is a lower frame 44. The lower frame 44 includes lower main pipes 46 which extend forwardly, downwardly and then rearwardly to eventually approach the steps 22. Another lower member 48 extends rearwardly therefrom to the pivot structure 42.

Figure 4:
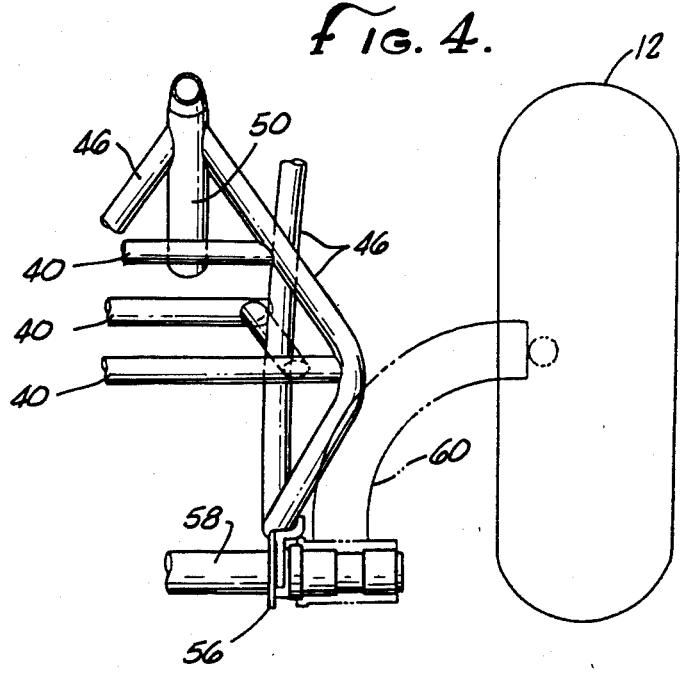
FIG. 4 is a plan view of a portion of the frame structure of the present invention.

A pipe frame 50 extends downwardly and forwardly at the centerline of the vehicle. The pipe frame 50 is fixed near its upper end to the upper frame 28 at the forward end of the upper main pipe. Near its lower end, it is fixed by means of reinforcing members 52 to the lower frame 44. Additional reinforcing members 54 strengthen the lower frame 44 through association with the pipe frame 50. Additional support for the lower frame is provided by spacers positioned between the lower main pipes 46 of the lower frame 44 as can best be seen in FIG. 4.

Figure 3:
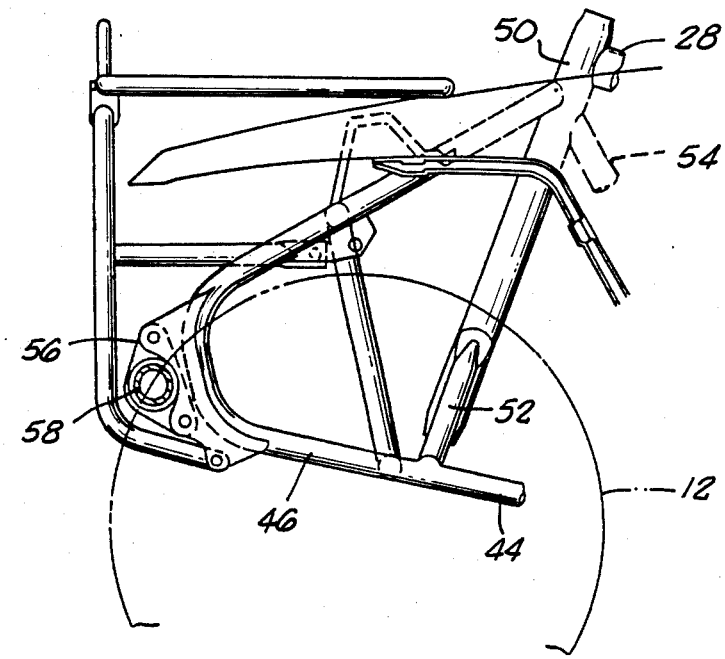
FIG. 3 is a detail side elevation of the forward frame structure of a frame of the present invention.

The forward portion of the lower frame 44 extends forwardly of the pipe frame 50 as can be seen in FIG. 3. At the forwardmost extent of the lower frame 44, associated with each of the lower main pipes 46, are brackets 56 which receive the supporting shaft 58 of the front suspension. A trailing arm 60 is pivotally mounted to the suspension support and extends to each of the front wheels 12. The front suspension may be best understood from viewing FIG. 6. A support cylinder 62 is positioned at the outer end of the trailing arm 60 to receive a pin 64 to which is mounted a support plate 66. The support plate in turn mounts the wheel about a spindle 68. A cushion member 70 is conventionally mounted to the arm 60.

Steering is provided by a steering handle 24, a steering shaft 72 and steering linkage 74. The handle 24 is fixed atop the steering shaft 72 by a plate assembly 76. At the lower end of the steering shaft 72, a steering plate 78 is coupled to the steering linkage 74 which, by means of a lever 80 is associated with the support plate 66. A like steering linkage 74 extends to each wheel.

The steering shaft 72 extends through the pipe frame 50 and is rotatably supported therein by bearing assemblies 82 and 84.

Thus, an improved, lighter and more compact frame structure for a four-wheel vehicle of the type employing a steering handle for directional control is disclosed. While embodiments and applications of this invention have been shown and described, it would be apparent to those skilled in the art that many more modifications are possible without departing from the inventive concepts herein. The invention, therefore, is not to be restricted except in the spirit of the appended claims.

What is claimed is:

1. A frame for a four-wheel vehicle having an engine and steerable front wheels, comprising
    an upper frame;
    a lower frame positioned below said upper frame and having rearwardly extending lower frame pipes, the engine being between said upper and lower frames;
    a singular pipe frame extending between said upper and lower frames and being fixed near its upper end to said upper frame and near its lower end to said lower frame; and
    a steering shaft extending through said singular pipe frame, having a steering handle attached thereto and being linked with the steerable front wheels, said lower frame including a pair of right and left lower main pipes which are fixed to said singular pipe frame intermediate said upper and lower frames and extend from said singular pipe frame forwardly and downwardly to points where they bend and then extend rearwardly and downwardly to rigidly connect to said rearwardly extending lower frame pipes of said lower frame.

2. The frame of claim 1 further comprising first and second supporting brackets to support the steerable front wheels, wherein said first and second lower main pipes are attached to said first and second supporting brackets.

3. The frame of claim 1 wherein said steering shaft is rotatably supported by bearing assemblies.

* * * * *